United States Patent [19]

Wayne

[11] Patent Number: 4,943,798
[45] Date of Patent: Jul. 24, 1990

[54] LARGE TRUCK REMOTE WHEEL TROUBLE WARNING SYSTEM

[76] Inventor: Wayman Wayne, 1890 Union St., Lake Station, Ind. 46405

[21] Appl. No.: 398,776

[22] Filed: Aug. 26, 1989

[51] Int. Cl.⁵ .................................................. B60C 23/00
[52] U.S. Cl. ....................................... 340/443; 340/446; 340/438
[58] Field of Search ............... 340/442, 443, 445, 446, 340/438, 425.5, 459; 116/34 R; 381/169, 188, 205

[56] References Cited

U.S. PATENT DOCUMENTS

| | | | |
|---|---|---|---|
| 3,489,998 | 1/1970 | O'Neal et al. | 340/446 |
| 3,496,903 | 2/1970 | Adahan. | |
| 3,526,873 | 9/1970 | Burt. | |
| 3,548,121 | 12/1970 | Gorike | 381/205 X |
| 3,717,030 | 2/1973 | McGhee et al. | |
| 3,934,223 | 1/1976 | Barabino | 340/446 |
| 4,038,634 | 7/1977 | Caliri | 340/459 |
| 4,103,282 | 7/1978 | Cook | 340/446 |
| 4,194,096 | 3/1980 | Ramsey | 381/169 |
| 4,355,297 | 10/1982 | Sinha et al. | |
| 4,389,884 | 6/1983 | Agulia. | |
| 4,421,052 | 12/1983 | Cook | 340/446 X |
| 4,514,598 | 4/1985 | Plice | 381/169 |
| 4,574,267 | 3/1986 | Jones. | |
| 4,644,317 | 2/1987 | Aingworth. | |
| 4,742,712 | 5/1988 | Kokubu. | |
| 4,749,993 | 6/1988 | Szabo et al. | |
| 4,761,996 | 8/1988 | Schmid et al. | |
| 4,814,744 | 3/1989 | Collins | 340/443 |
| 4,843,367 | 6/1989 | Saito | 340/463 |

OTHER PUBLICATIONS

Realistic ® Ultra Slim Lightweight Electret Condenser Microphone, Cat. No. 33-2011 (1985).

*Primary Examiner*—Joseph A. Orsino
*Assistant Examiner*—Brian R. Tumm
*Attorney, Agent, or Firm*—Richard G. Kinney

[57] ABSTRACT

A safety system for large and long over-the-road vehicles, such as a tractor semitrailer rig, having wheels mounted remotely from the vehicle's cab. A conventional airborne sound receiving microphone is mounted within a mechanical vibration damping housing at the bottom of the vehicle body near and aimed at the remote wheels to receive sounds from that area of the vehicle. The mounting and housing are constructed to prevent or greatly lessen mechanical vibration and sounds from reaching the microphone through the vehicle body. A communication cable runs from the microphone and housing to the cab and is connected through an amplifier to a speaker provided inside the cab. While the vehicle is being driven, the speaker reproduces a significant portion of the airborne sound received by the microphone within the cab. The system produces as background noise in the cab the sounds from the rear wheel area of the vehicle and allows the driver to note and react to changes in such noise as may result from a flat tire or other problem.

4 Claims, 3 Drawing Sheets

LARGE TRUCK REMOTE WHEEL TROUBLE WARNING SYSTEM

FIELD OF THE INVENTION

The present invention is directed to a new and improved alerting system for warning the operator of a truck of possible trouble with tires or wheels or like equipment which are physically remote from the cab of the truck.

BACKGROUND OF THE INVENTION

In large trucks and especially in tractor semitrailer rigs, it is common for flat tires and other rapidly developing wheel problems, especially those occurring in the wheels remote from the cab, to go undetected by the operator. This is primarily due to the distance involved and the fact that the standard enclosed cab prevents the vibration of, for example, a flat rear tire from being heard or felt by the operator. This contrasts with the conventional passenger car wherein a flat tire or other wheel problem is easily felt and heard by the driver. It takes a very insensitive car driver to not quickly become aware of the noise and vibration changes resulting from wheel or tire problems in a car. However, given the circumstances of a large truck and especially a tractor semitrailer rig with four or more wheels on a remote axle, it is the unusual driver who will be able to detect tire or wheel trouble in a remote wheel. Thus, it is common for small problems such as a flat or underinflated tire to go undetected by the vehicle operator and, as is the tendency with neglected problems, for the small problem to become a large problem. Thus, it is not uncommon to see destroyed truck tires littering our superhighways. Tires which could have been fixed or retreaded are commonly being destroyed simply because the operator of the vehicle is not aware of a flat. These large truck tire are expensive and the litter of tire parts along our nation's highways represents a collective large loss to the vehicle owners and to our economy in general.

Further, it is not uncommon for tires and even whole wheels to be thrown off a fast-moving rig to the danger and harm of others. Damaged large truck tires and wheels have been spun off moving semitrailers and hit passenger cars with often fatal results. Also, other problems and dangers can and do arise at the rear wheel area of the vehicle. These include loose or defective equipment dragging from the trailer. For example, tiedown chains sometimes have come loose at one end and are dragged and whipped about the rear of a trailer. Also, spare wheels and tires, which are commonly mounted underneath the trailer, occasionally because of a broken connection to the trailer or other defect become loose and descend to contact and be dragged on the roadway. If not discovered and rectified this can result in the mounting and/or the spare wheel dropping off the moving trailer and becoming an unguided missile on the highway. Incidents of such loose wheels or debris hitting other vehicles and people, resulting in maiming and death, have occurred. Thus, besides economic loss, there is a large loss in human life and injury resulting from these problems. In almost all of these cases, the faulty wheel or tire or other problem could have been detected earlier and the problem corrected before the harm was done.

The present situation is costly to the owner of the vehicle, as it means that tires which could be repaired or recapped are destroyed. It is also dangerous to the vehicle and others using the road, and it can lead to accidents.

A problem of this magnitude has not, of course, gone unnoticed, and a number of systems for warning a vehicle's operator of low pressure or flat tires or wheel trouble have been proposed. Among those proposed are the devices and system of the following U.S. Pat. Nos.: 4,761,996, to Schmid et al., issued Aug. 9, 1988; 4,749,993, to Szabo et al., issued June 7, 1988; 4,742,712, to Kokubu, issued May 10, 1988; 4,644,317, to Aingworth, issued Feb. 17, 1987; 4,574,267, to Jones, issued Mar. 4, 1986; 4,389,884, issued to Agulia, June 28, 1983; 4,355,297, to Sinha et al., issued Oct. 19, 1982; 3,717,030, to McGhee et al., issued Feb. 20, 1973; 3,526,873, to Burt, issued Sept. 1,1970; and 3,496,903, to Adahan, issued Feb. 24, 1970.

The prior art generally has approached the problem in two ways: (1) direct sensing and signalling of low pressure in a tire; or (2) sensing of mechanical vibration of a wheel, axle or other mechanically linked part and signalling any abnormal vibrations. These schemes often require expensive components and are difficult and time consuming to install and rarely allow for ease of retrofitting into existing rigs.

Summary of the Invention

To help meet this need and to solve this problem, the present invention provides an improved system for a long rig which includes a conventional sound microphone. A relatively inexpensive sound microphone may be and has been successfully used in a prototype. Further provided in the invention system is a mounting for positioning the microphone underneath the trailer or truck body in a position where it can pick up airborne sounds generated by the wheels and other equipment in the vicinity of the rear wheels. For example, the microphone could be mounted beneath a trailer a few feet forward of the rear wheel set and pointed at the rear wheels. Further, in accordance with a major feature of the present invention, the microphone is mounted so as to substantially damp out mechanical vibrations receiced from the truck or trailer body. For example, the microphone may be completely surrounded by foam rubber in a casing which is affixed to the trailer through a rubber or like vibration damper. The system further includes a flexible cable run from the microphone to the cab of the vehicle (such as an amplifier and speaker) and coupled to respond to the airbone sounds received by the microphone to alert the operator of abnormal sounds from the wheels.

This present invention is founded on the discovery that despite wind and other road sounds, the airborne sounds from the area of the tires can be successfully picked up and used providing the mechanical vibrations from the vehicle boby can be isolated or damped out. This is, of course, the opposite approach from references such as Burt, U.S. Pat. No. 3,526,893, which attempt to sense and use the mechanical vibration of the wheel or axle to generate a warning signal.

Further, the present invention can use standard and inexpensive components to construct its system which can be easily installed and retrofitted. It is not necessary, for example, to remove a wheel or even to run a cable to the rear wheels, as the pickup unit of the present invention can be mounted ten or more feet in front of the rear wheels.

The invention, together with the advantages thereof, may best be understood by reference to the following description taken in connection with the accompanying drawings, in the several figures of which, like reference numerals identify like elements.

DETAILED DESCRIPTION OF A PREFERRED EMBODIMENT

Figure 1:
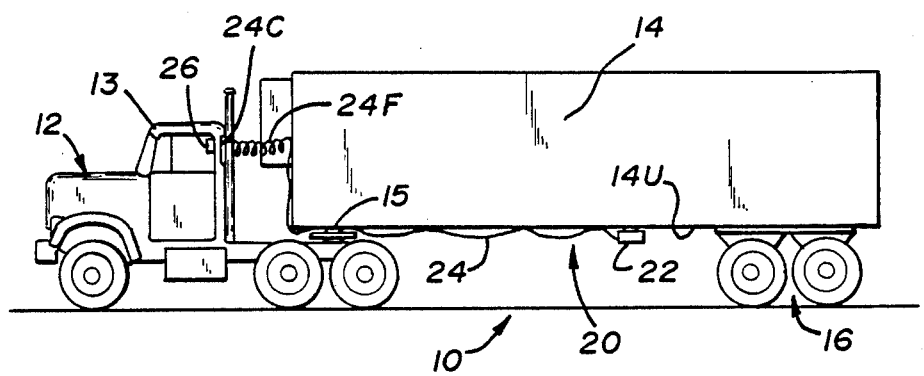
FIG. 1 is a side elevational view illustrating a tractor semitrailer employing the present invention.

Referring to FIG. 1, there is depicted a long truck or rig generally referred to by the number 10. The particular truck 10 depicted a tractor semitrailer rig including a tractor prime mover 12 with an enclosed cab 13 for the operator or driver and a trailer 14 connected to the tractor 12 by the usual connection 15. The truck 10 may be of entirely conventional construction and although a semitrailer truck rig is depicted for specificity, it should be understood that the invention may be used with any other type of vehicle which has wheels, such as the rear wheels 16, positioned at a considerable distance from the cab. The rig 10 may be of entirely conventional construction and operation and therefore need not be here described in detail. Thus it should be understood that a conventional trailer has its wheels 16 located conventionally at opposite sides of the bottom of the trailer 14.

In accordance with the present invention, however, the truck 10 is provided with a system 20 comprising a microphone mounting assembly 22 mounted at the underside 14U of the trailer 14, communication means in the form of a cable 24 running from the assembly 22 forward to the front wall of the trailer and from there to the cab. The portion 24F of the cable running between the trailer and the cab is flexible (as may be the entire cable 24). The portion 24F of the cable 24 is long enough to span the distance between the tractor 12 and trailer 14 no matter what normal moved positions they assume relative to each other. This cable portion 24F is preferably spring supported in a manner analogous to other cables and flexible tubing which are commonly connected between the trailer 14 and the tractor 12. The system 20 further includes an alerting unit 26 which is mounted within the cab 13. This unit is preferably connected by a releasable coupling 24C, which coupling is mounted at the rear of the cab 13 so that it can be easily disconnected when the trailer 14 is disconnected from the tractor 12. The three elements 22, 24, and 26 when provided separately from the rig 10 constitute a kit of parts for retrofitting any conventional rig.

Although the unit 26 is depicted as being mounted to the inside back wall of the cab 13, it may be placed in any convenient position within the cab 13. Thus, it could be incorporated into the dash or employ an existing radio amplifier and speaker already in the cab 13. The unit 26 may be connected to the power supply (battery/alternator) of the tractor 12 in the same manner as would be an aftermarket radio or tape player. It can, of course, also employ its own battery power supply, but it is desirable for reasons of reliability to be connected to the vehicle's power supply, either by a special wire or through a cigarette lighter connector.

Figure 2:
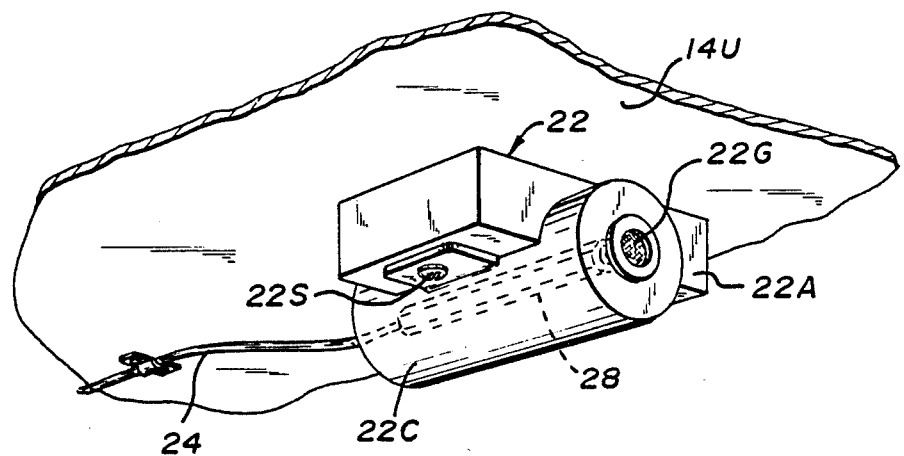
FIGS. 2 is a perspective view of one component of the invention system, a mounting assembly and microphone, with interior parts shown in dashed outline.
Figure 3:
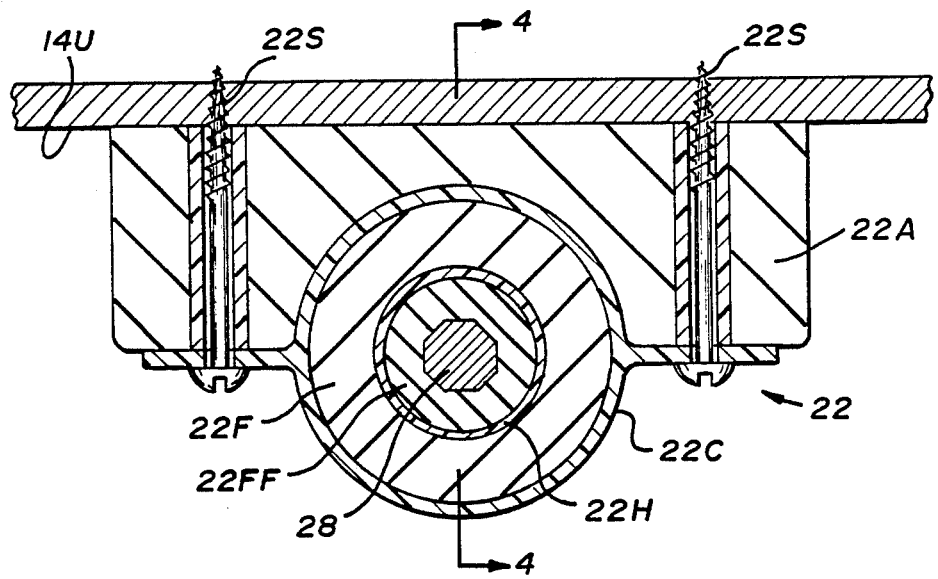
FIG. 3 is a vertical transverse sectional view of the assembly of FIG. 2.
Figure 4:
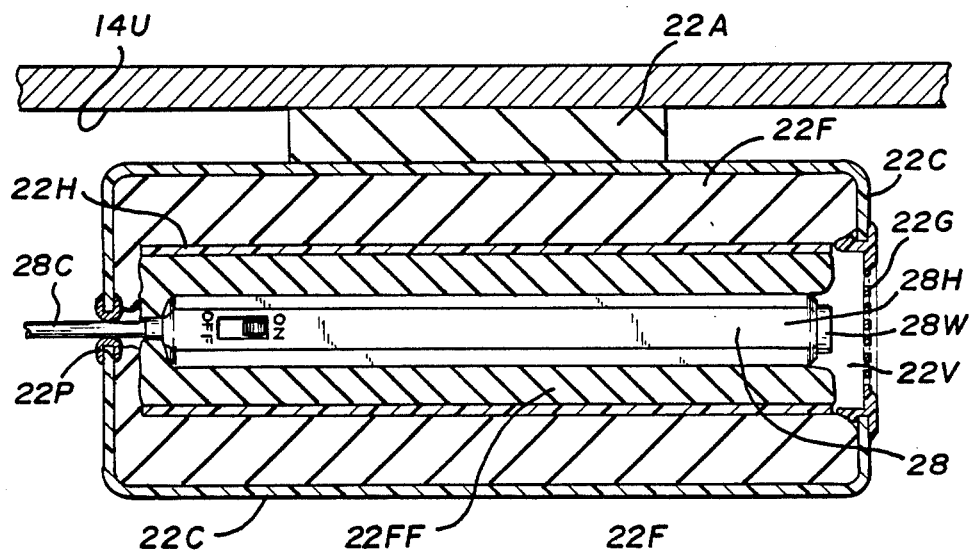
FIG. 4 is a vertical longitudinal sectional view of the assembly of FIGS. 2 and 3 as seen from the line 4—4 in FIG. 3.

Referring to FIGS. 2-4, there is depicted the assembly 22 in more detail as well as a microphone 28, mounted within the assembly 22. The mounting assembly 22 comprises vibration-damping members (foam rubber or the like) 22A which is secured by sheet metal screws 22S or the like. The screws 22S also serve to secure in place a weatherproof casing 22C made of thin walled plastic or equivalent waterproof housing material. Inside the casing 22C is the microphone 28 surrounded by and supported by vibration-damping plastic foam material 22F. The pickup head 28H of the microphone 28 is not enveloped by the cushioning foam 22F but instead is in an open small volume 22V just behind a splash-proof grill 22G which forms the rearward-pointed end of the casing 22C.

The vibration-damping mounting assembly 22 preferably includes a second cylindrically shaped housing 22H which is held in place by the foam 22F in a concentric manner with the major portion of the casing 22C. This housing does not touch directly the casing 22C and is filled with resilient foam 22FF of a higher density than that of the foam 22F, which foam 22FF in turn supports and secures in place the microphone unit 28.

The microphone unit 28 preferably is equipped with a windshield 28W which with the grill 22G tends to eliminate wind noise. The output from the microphone is fed through cable 28C which passes through a waterproof gasket 22P.

This construction suspends and surrounds the microphone 28 and the housing 22H and the casing 22C in foam rubber or foam plastic vibration-damping material and serves to effectively absorb and stop the pickup by the microphone of mechanically transmitted vibrations from the floor 14U and from the trailer 14.

The mounting 22 is preferably secured to the trailer bed 14U at about the longitudinal center of the trailer 14 so it is about equally spaced from either side. The casing 22S is preferably aligned along the center line of the truck facing the center of a wheel carriage for the wheels 16 and about eight to twelve feet forward of the wheels 16. The microphone 28 should be sufficiently multi-directional so as to pick up sound from any of the wheels 16 when so arranged. With the microphone used in the prototype system and identified below, this geometric arrangement workerd well. Of course, with other types of microphones the arrangement may have to be changed somewhat. The key point is to position the unit so that the microphone can pick up airborne sound waves from the wheels.

Figure 5:
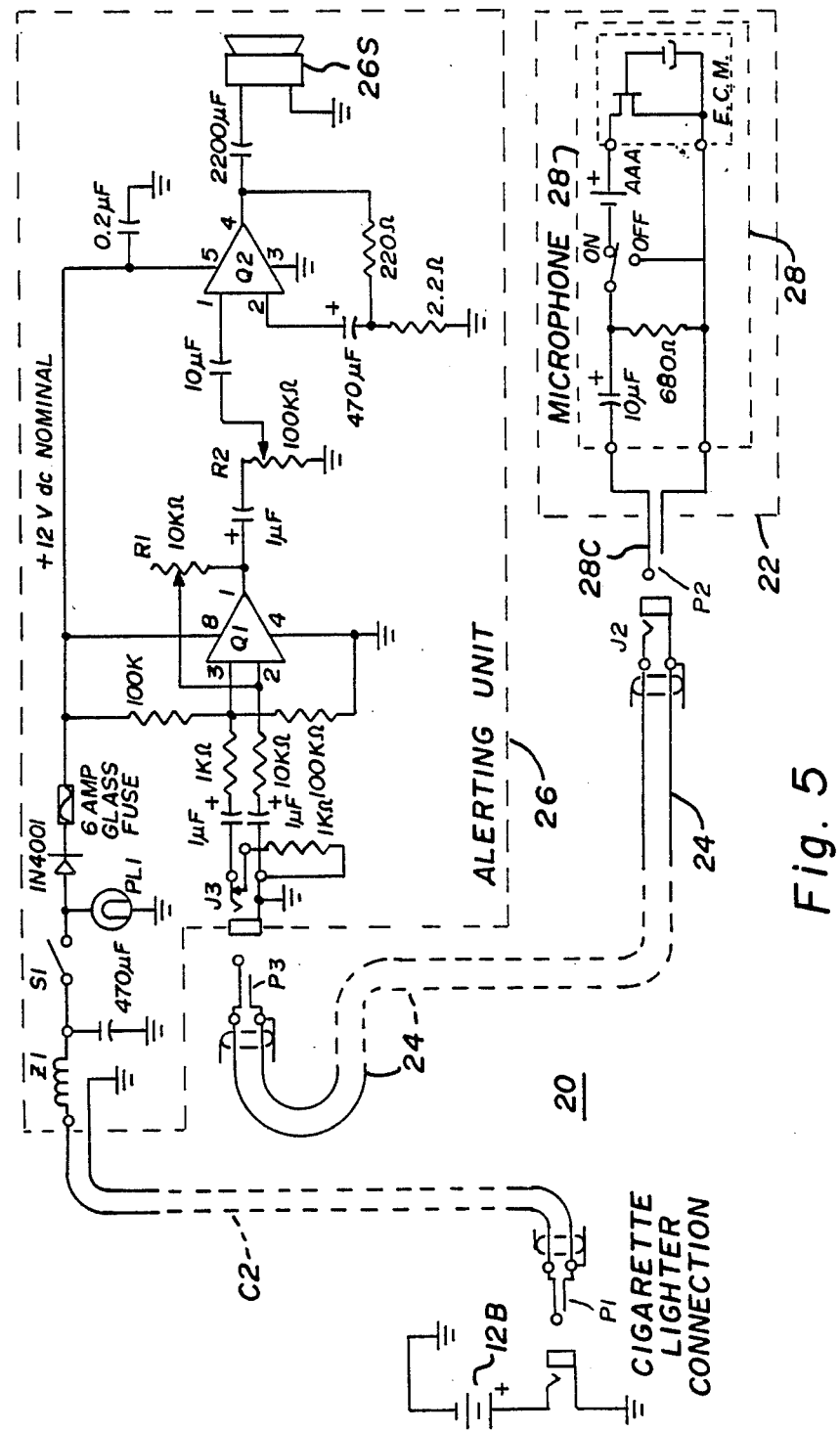
FIG. 5 is an electrical circuit diagram for the system of FIGS. 1-4.

Referring to FIG. 5, there is depicted a circuit diagram of the system 20 of FIGS. 1 and 2. The system 20 comprises three main components: the microphone assembly 22, the cable 24 and alerting unit 26 are all shown in FIG. 5 wherein the actual values and identification of components of a constructed and tested prototype are given for specificity. It should be understood that numerous other components, circuits and constructions can also be employed without departing from the spirit of the invention. Indeed, applicant himself may well decide for purposes of economy or as a result of future experience and experiments to alter the circuitry and components of this invention. At the time of making this application, the set out values and below listed components are his best mode of practicing this invention. The microphone assembly 22 includes the microphone 28 which in the prototype was a Realistic brand Electret Condenser Microphone, Cat. No. 33-2011. The circuit diagram of the microphone 28 shown is that provided by the manufacturer for this component. As can be seen from FIG. 5, the microphone included a pickup unit E.C.M. coupled through a battey AAA (an AAA battery installed in the housing of microphone 28), an on-off switch and a filter comprising a 10 microfarad capacitor in series connection and a 680 ohm resistor in parallel. The output is fed to P2, a suitable plug. The plug P2 is, in practice, mounted in the socket J2 of the cable 24 and feeds the output from the microphone 28 to the cable 24. When used in the system 10, the on-off switch may be eliminated if desired.

The cable 24 through plug P3 and socket J3 (to which it is connected in practice) feeds the signal to the circuit of the unit 26. The plug P3 is preferably mounted on or through the rear wall of the cab 13 (FIG. 1) so that the cable 24 can be easily disconnected when the trailer 14 is disconnected from the tractor unit 12. (Alternatively, the cable 24 can be made in two segments which disconnect at an appropriate spot.) In practice, it is desirable to shield the cable or use a self-shielding coaxial cable.

The signal fed from the cable 24 and received at socket J3 is amplified and fed to a speaker 26S by an amplifier circuit including the operational amplifiers Q1, Q2. In the prototype, Q1 was a TL082 Dual BiFet Operational Amplifier (Radio Shack number RS-276-171) and Q2 was an LM 383/TDA2002 8 watt audio amplifier (RS-276-703). The speaker used in the prototype was Model 508 of J. W. Davis & Co., Dallas, Tex., a five-inch 8 ohm speaker. Electrical noise shielding of the housing of the unit 26 is desirable.

Power to operate the amplifier is provided from the battery (and/or alternator) of the tractor 12, symbolized in FIG. 5 by the battery 12B. This may be connected in any convenient manner such as by the cigarette lighter plug connector P1 and cable C2. This voltage source tends in practice to be quite "noisy" and therefore a filter Z1 is provide. (In the prototype this filter was Radio Shack Noise Eliminator Kit, part RS-270-030.) The filtered power is fed through Z1 and through an opticon on-off switch S1 and optional "on" light PL1 (a light emitting diode mounted to be seen on the housing of the unit 26), a rectifying diode IN4001 and a 6 amp fuse.

The operation of the amplifier circuit made of Q1 and Q2 and the assorted components is to amplify the electrical signal picked up off of the cable 24 and feeds it to the speaker 26S which reproduces it as sound within the cab 13. A potentiometer R2 is controlled by a knob on the unit 26 to set the volume level for the speaker 26S.

The microphone 28 picks up airborne signals in the range of about 100 Hz to 15000 Hz, that is, within the normal human hearing range, and a significant portion of this range is reproduced as airborne sound by the speaker 26S within the cab 13.

This is an important consideration in the present invention and one which serves to distinguish it from prior alerting systems. In effect, the present invention uses one of the most sensitive instruments to detect and alert the operator of rear wheel and other trouble at the rear of his vehicle: the human ear and intelligence. Most car drivers become used to the ambient normal sounds of their moving vehicles and are able to detect small changes in the sounds it makes. And if such drivers are conscientious, the will react to such subtle sound changes by at least investigating the cause. By picking up similar sounds from the rear of the long truck and reproducing them in the cab, the operator will also become used to the usual or normal background sounds at the rear wheels of his truck. As with other background noises, we humans tend to "tune them out" and this ability allows the driver to listen to the radio or a tape, carry on a CB or cellular phone conversation and do the other normal things done by such a driver without the sounds reproduced by the unit 26 being any more of a distraction than the sounds made by front tires, engine and air blowing by the cab.

However, if unusual sounds are picked up by the microphone 28 and reproduced in the cab 13, the operator will respond to them in the same way humans respond to any change in background noise—he will notice them and, if conscientious, he will investigate the cause of the change.

As mentioned above, this invention has been tested on a vehicle with a trailer and it was confirmed that useful sounds could be obtained and reproduced. The present invention will pick up and clearly reproduce the distinctive "slap" of a low air or flat rear tire and alert the driver to this dangerous and potentially costly situation. Further, the unit can be used even with the truck stopped, when it can help alert the driver to other problems at the rear of his long truck which he might otherwise miss.

While one particular embodiment of the invention has been shown and described, it will be obvious to those skilled in the art that changes and modifications may be made without departing from the invention and, therefore, the aim in the appended claims is to cover all such changes and modifications as fall within the true spirit and scope of the invention.

It should now be apparent that a new and improved large truck remote wheel trouble warning system has been described which is easy and inexpensive to make, install and use. By using common elements such as a conventional microphone, amplifier and speaker, the system can be manufactured at low cost. Because the microphone assembly need not be mounted on or in the rear wheel carriage, and can be located at a relatively clear and easily accessible place at the bottom of a trailer or truck body, that portion of the system is quite easily installed. Drilling two pilot holes and driving in two sheet metal or like screws will normally complete the installation of the microphone assembly. The only specially manufactured part used in the above described system in the housing for the microphone. But even that part is relatively easy to assemble give, the above description and depiction. By relying on the alerting of human ears to detect unusual sounds, the present invention avoids the need for special filters and expensive logic units designed to detect such sounds. While the present invention at least in its broader aspects can be employed with such units, if desired, it is preferred that the invention be practiced using only a minimal amount of parts and circuitry so as to make it more acceptable in the marketplace, especially in the aftermarket. One advantage of the present invention is that it can be easily and economically retrofitted onto the existing stock of large trucks.

It should also now be apparent that an easily installed and used system has been provided which, if used extensively, will result in earlier detection of tire and other problems on moving trucks and trailers and result in the saving of money, the avoidance of accidents, the avoidance of injury and lessening of the loss of life caused now by such needless accidents.

I claim:

1. In a tractor semitrailer rig having a closed cab from which a driver may operate the rig and at least one trailer, which trailer has an underside and wheels monunted at the underside of that trailer, at least some of which wheels are mounted remote from the cab and on opposite sides of the trailer, the improvement comprising:

only one conventional sound sensitive microphone for picking up airborne sound waves in the range of human hearing;

mounting means for said microphone for mounting it to the underside of the trailer at only one location and in such a manner so as to allow said microphone to be able to pick up sound carried by the air from the remote wheels of the trailer from either opposite side of the trailer and from other equipment mounted to the trailer in the vicinity of the remote wheels, said mounting means including means for substantially damping out mechanical vibrations received from said trailer;

communication means connected to said microphone and secured to said trailer, said communication means serving to connect signals developed by said microphone to said cab; and means mounted inside the enclosed cab for receiving signals from said communication means, and responsive to those signals received from said communication means for alerting the driver to unusual airborne sounds picked up by said microphone, and wherein said alerting means mounted inside the enclosed cab includes a conventional speaker for substantially reproducing the airborne sound waves within the range of human hearing which are picked up by said microphone mounted to the underside of the trailer.

2. The invention of claim 1 wherein said communication means comprises cable means for establishing direct electrical connection between said microphone and said alerting means within said cab, and said cable means including a flexible length bridging between said cab and said trailer.

3. In a large vehicle having a closed cab, a trailer with an underside and at least one set of wheels mounted on the underside of the vehicle remote from the cab by a distance such as to make the hearing of abnormal noises in or about said wheels by a person in the cab difficult or impossible, such set of remote wheels including at least one wheel on either siide of the trailer, the improvement comprising;

only one conventional sound sensitive microphone for picking up airborne sound waves in the range of human hearing;

means for mounting said microphone at the underside of the vehicle at only one location and in such a manner so as to be able to pick up sound carried by the air from the remote wheels, including the remote wheels on either side of the trailer, said mounting means including means for substantially damping out mechanical vibrations received from the vehicle, and said mounting means being aligned along the approximate center line of the vehicle and about eight to twelve feet forward of the remote wheels;

communication means connected to said microphone, said communication means being secured so as to serve to communicate signals developed by said microphone to said cab;

means mounted inside the enclosed cab for receiving signals from said communication means, and responsive to those signals received from said communication means for alerting the driver to unusual airborne sounds picked up by said microphone; and wherein said alerting means mounted inside the enclosed cab includes a conventional speaker for substantially reproducing the airborne sound waves within the range of human hearing which are picked up by said microphone.

4. The invention of claim 3 wherein said communication means comprises cable means for establishing direct electrical connection between said microphone and said alerting means within said cab, and said cable means including a flexible length bridging between said cab and said trailer.

* * * * *